(12) United States Patent
Liu et al.

(10) Patent No.: US 6,304,438 B1
(45) Date of Patent: Oct. 16, 2001

(54) COMPUTER CHASSIS

(75) Inventors: Yu-Tai Liu, Hsin-Chuang; Alvin Liu, Pa-Li; Yung-Lung Chen, Chung-Ho, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/347,368

(22) Filed: Jul. 6, 1999

(30) Foreign Application Priority Data

Dec. 4, 1998 (TW) ................................................ 87220292

(51) Int. Cl.[7] ...................................................... H05K 7/00
(52) U.S. Cl. .......................... 361/685; 361/727; 361/740; 312/223.2
(58) Field of Search .................................... 361/685, 725, 361/726, 683–686, 724–727, 732, 740, 754, 759; 312/223.2; 439/60, 152

(56) References Cited

U.S. PATENT DOCUMENTS

| 5,921,644 | * | 7/1999 | Brunel et al. | 312/223.2 |
| 5,931,550 | * | 8/1999 | Chen | 312/223.2 |
| 5,975,659 | * | 11/1999 | Yang et al. | 312/223.2 |
| 5,995,364 | * | 11/1999 | McAnally | 361/685 |
| 6,053,586 | * | 4/2000 | Cook et al. | 361/683 |
| 6,234,592 | * | 5/2001 | Liu et al. | 312/223.2 |

\* cited by examiner

*Primary Examiner*—Leo P. Picard
*Assistant Examiner*—Hung Van Duong
(74) *Attorney, Agent, or Firm*—Wei Te Chung (57) ABSTRACT

A computer chassis includes a bottom panel having front and rear portions forming front and rear perpendicular flanges. Two openings are defined in the bottom panel proximate each of the front and rear portions and two retaining tabs are formed on the front flange. A front panel has a lower portion positioned on the bottom panel and abutting against the front flange. The lower portion of the front panel forms two projections received in the openings of the front portion of the bottom panel and defines two slots receiving the retaining tabs of the bottom panel therein thereby firmly retaining the front panel on the bottom panel. A rear panel has a lower portion positioned on and abutting against the rear flange. The lower portion of the rear panel forms two projections received in the openings of the rear portion of the bottom panel for properly positioning the rear panel on the bottom panel. Holes are defined in each of the front and rear panels and are aligned with corresponding holes defined in the bottom panel for receiving fasteners therethrough to secure the front and rear panels to the bottom panel.

15 Claims, 8 Drawing Sheets

COMPUTER CHASSIS

BACKGROUND OF THE INVENTION

1. Field of the Invention

The present invention generally relates to a computer chassis, and in particular to a computer chassis that can be easily assembled.

2. The Prior Art

A personal computer comprises a chassis for accommodating computer components therein. One type of the computer chassis available in the market comprises a bottom panel and front and rear panels mounted to and extending from opposite ends of the bottom panel. Fasteners, such as bolts and rivets, secure the front and rear panels to the bottom panel. Alternatively, welding is adopted to fix the panels together. Conventionally, when mounting the front and rear panels to the bottom panel, an assembler must grasp the panels. Thus, product precision may not be ensured, labor time is increased, and costs are high. Furthermore, welding machines or fastener-applying devices may potentially injure the assembler. Examples of conventional computer chassis are disclosed in Taiwan Patent Application Nos. 85220294 and 84213528 and U.S. Pat. Nos. 5,031,070, 5,491,611 and 5,175,670.

It is thus desired to provide a computer chassis which facilitates assembly for addressing the above problems encountered in the prior art.

SUMMARY OF THE INVENTION

Accordingly, an object of the present invention is to provide a computer chassis that can be readily assembled.

Another object of the present invention is to provide a computer chassis having a high product precision resulting in a low rate of flawed product.

A further object of the present invention is to provide a computer chassis that may be assembled with low risk of injury to an assembler.

To achieve the above objects, in accordance with the present invention, a computer chassis comprises a bottom panel having front and rear portions forming front and rear perpendicular flanges. Two openings are defined in the bottom panel proximate each of the front and rear portions and two retaining tabs are formed on the front flange. A front panel has a lower portion positioned on the bottom panel and abutting against the front flange. The lower portion of the front panel forms two projections received in the openings of the front portion of the bottom panel and defines two slots receiving the retaining tabs of the bottom panel therein thereby firmly retaining the front panel on the bottom panel. A rear panel has a lower portion positioned on and abutting against the rear flange. The lower portion of the rear panel forms two projections received in the openings of the rear portion of the bottom panel for properly positioning the rear panel on the bottom panel. Holes are defined in each of the front and rear panels and are aligned with corresponding holes defined in the bottom panel for receiving fasteners therethrough to secure the front and rear panels to the bottom panel.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
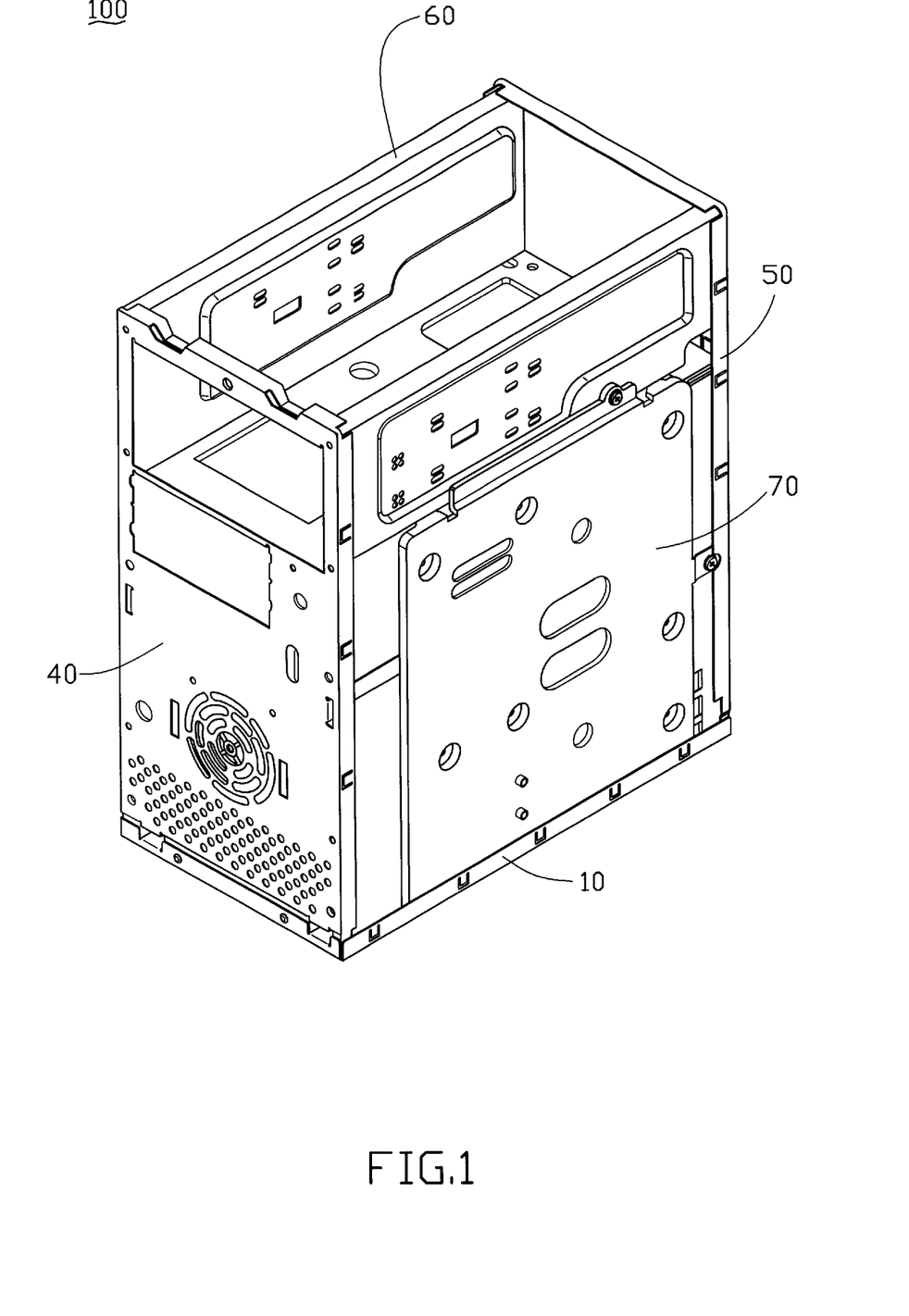
FIG. 1 is a perspective view of a computer chassis constructed in accordance with the present invention.
Figure 8:
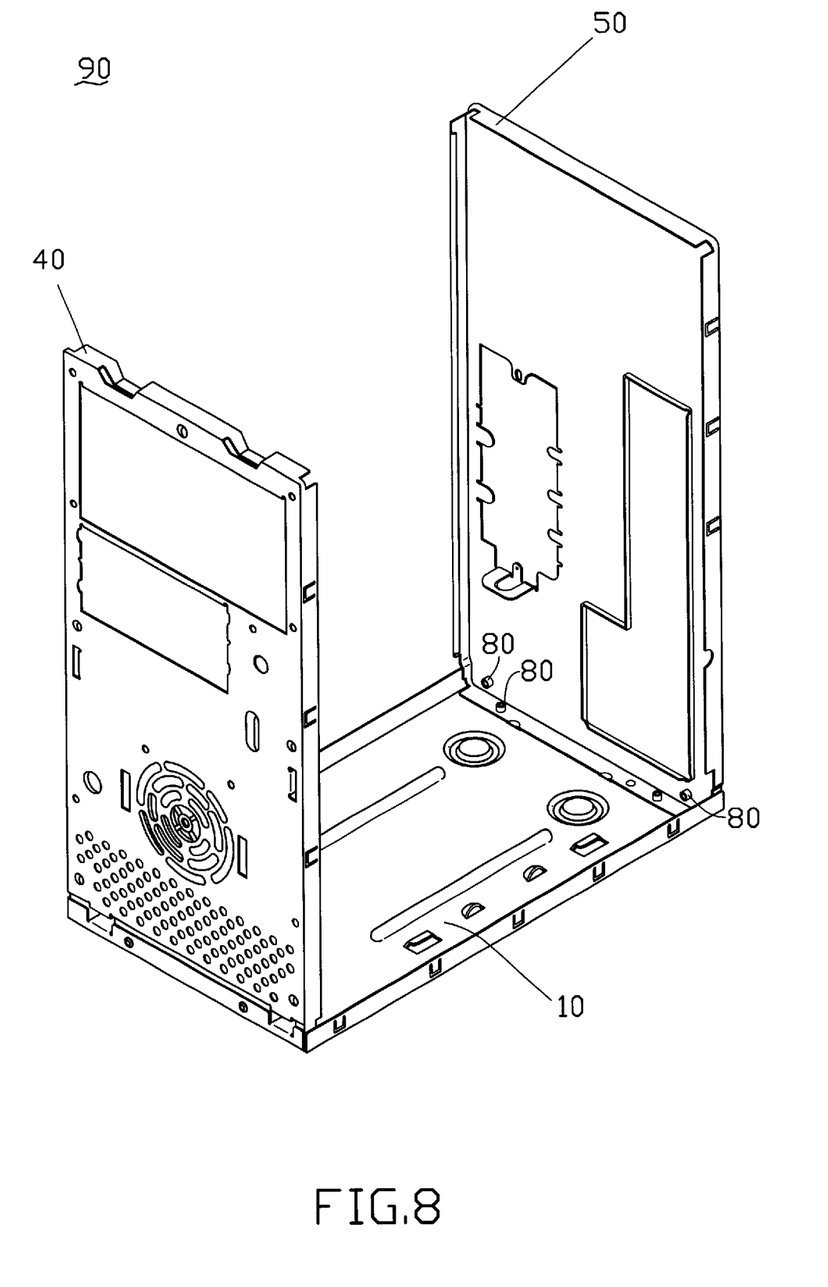
FIG. 8 is an assembled view of the bottom panel and front and rear panels.

Referring to the drawings and in particular to FIG. 1, a computer chassis 100 constructed in accordance with the present invention comprises a bottom panel 10 and front and rear panels 40, 50 mounted to and extending from opposite ends of the bottom plate 10. A disk drive rack 60 for supporting at least one disk drive (not shown) is mounted between the front and rear panels 40, 50 on a top side of the chassis 100. A main board support plate 70 for supporting a main board (not shown) is attached to a lateral side of the chassis 100. The front and rear panels 40, 50 are fixed to the bottom panel 10 by means of fasteners 80 to form a U-shaped base frame 90 as shown in FIG. 8. Alternatively, the front and rear panels 40, 50 may be fixed to the bottom panel 10 by means of welding.

Figure 2:
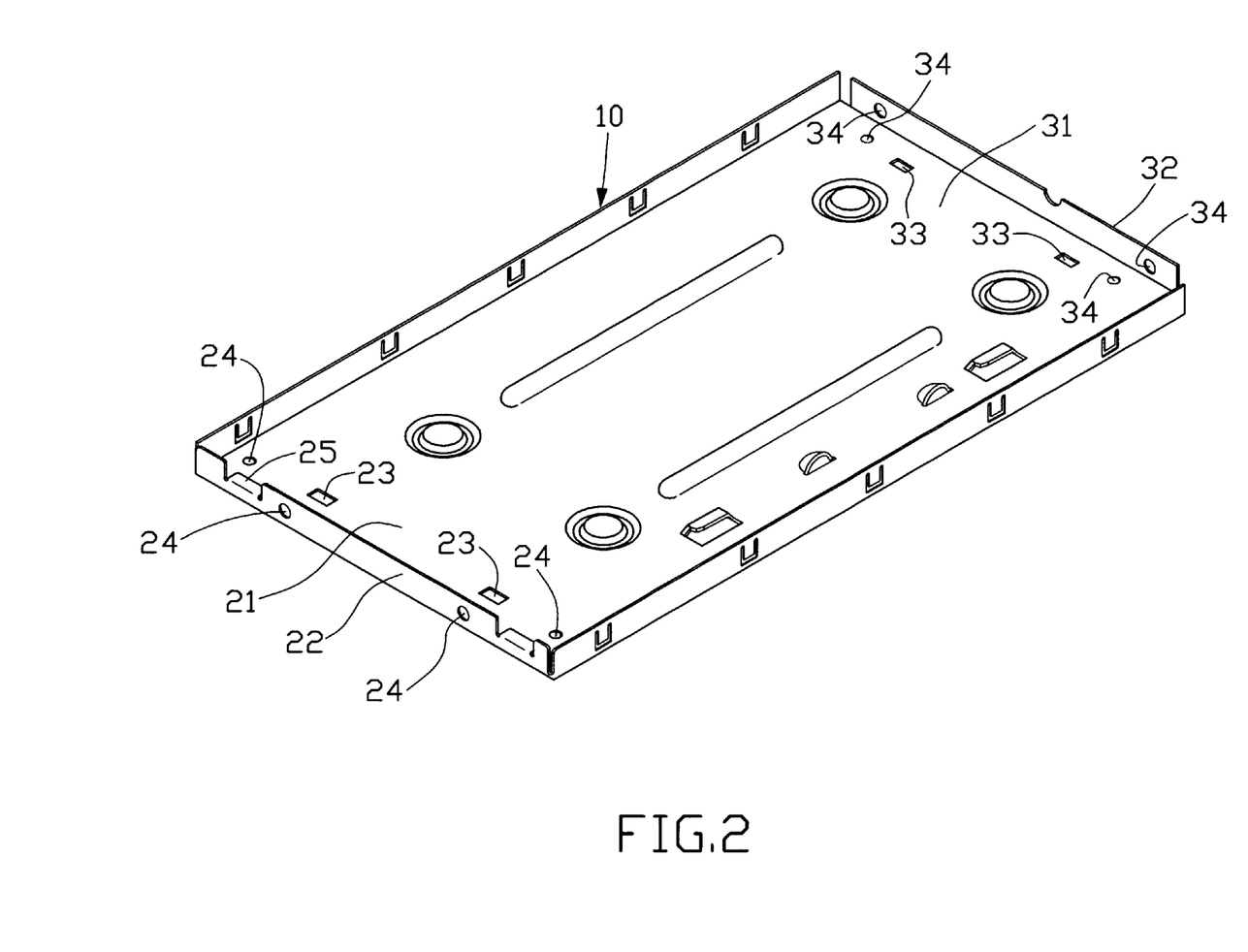
FIG. 2 is a perspective view of a bottom panel of the computer chassis of the present invention.
Figure 3:
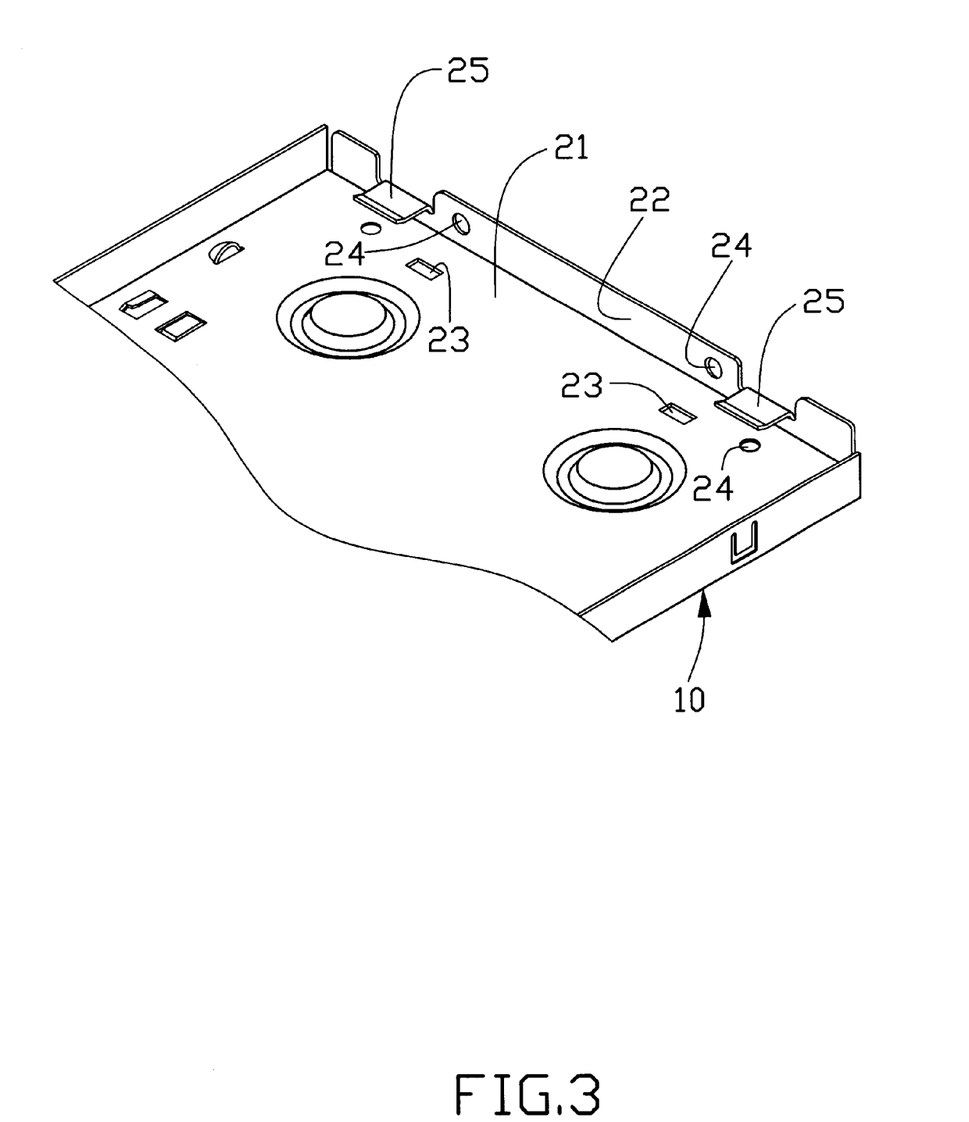
FIG. 3 is an enlarged view of a front portion of the bottom panel of FIG. 2.

Referring to FIGS. 2, 3 and 8, the bottom panel 10 is a rectangular plate having front and rear perpendicular flanges 22, 32 formed on front and rear portions 21, 31 thereof. Two rectangular openings 23, preferably symmetrical with respect to each other, are defined in the front portion 21 of the bottom panel 10. Two similar openings 33, preferably symmetrical with respect to each other, are defined in the rear portion 31. Fastener holes 24, 34 are defined in the front and rear portions 21, 31 and the front and rear flanges 22, 32 for receiving the fasteners 80 to secure the front and rear panels 40, 50 to the bottom panel 10. Two inwardly-extending retaining tabs 25 are formed on the front flange 22 and are substantially parallel to the bottom panel 10.

Figure 4:
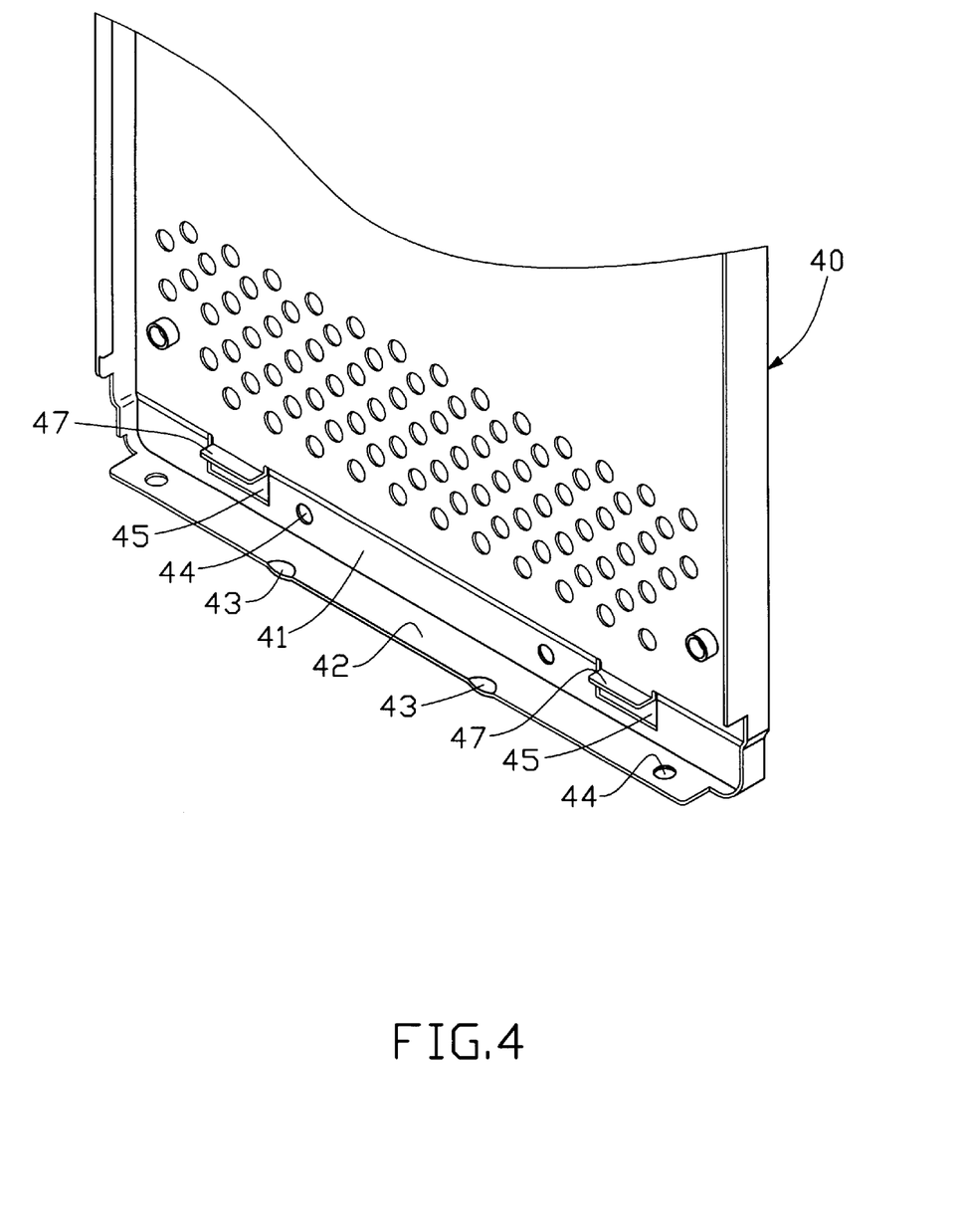
FIG. 4 is a perspective view of a lower portion of a front panel of the computer chassis in accordance with the present invention.

As shown in FIG. 4, a bottom flange 42 is formed on a lower portion 41 of the front panel 40 and is substantially perpendicular thereto. Two projections 43 are formed on the bottom flange 42. The projections 43 may be concave portions formed on the bottom flange 42 by means of stamping or pressing. Holes 44 defined in the lower portion 41 and the bottom flange 42 of the front panel 40 are aligned with the fastener holes 24 of the bottom panel 10 for receiving the fasteners 80 to secure the front panel 40 to the bottom panel 10. Two slots 45 are defined in the lower portion 41 of the front panel 40 for receiving the retaining tabs 25 of the bottom panel 10 thereby retaining the front panel 40 on the bottom panel 10. Preferably, the slots 45 are stamped on the lower portion 41 of the front panel 40 whereby a tab 47 is formed and extends from an edge of each slot 45.

Figure 5:
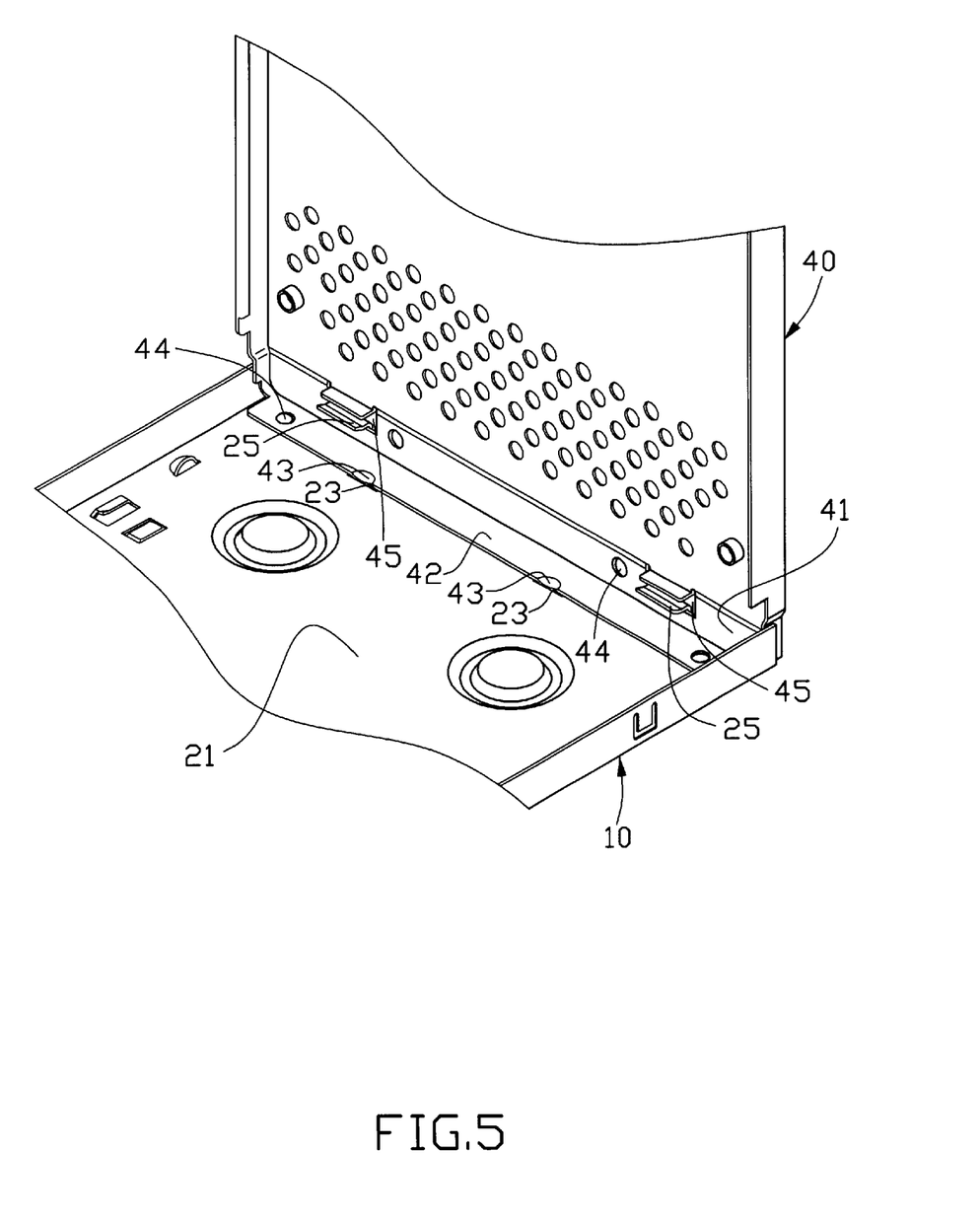
FIG. 5 is a perspective view of a portion of the front and bottom panels assembled together.
Figure 6:
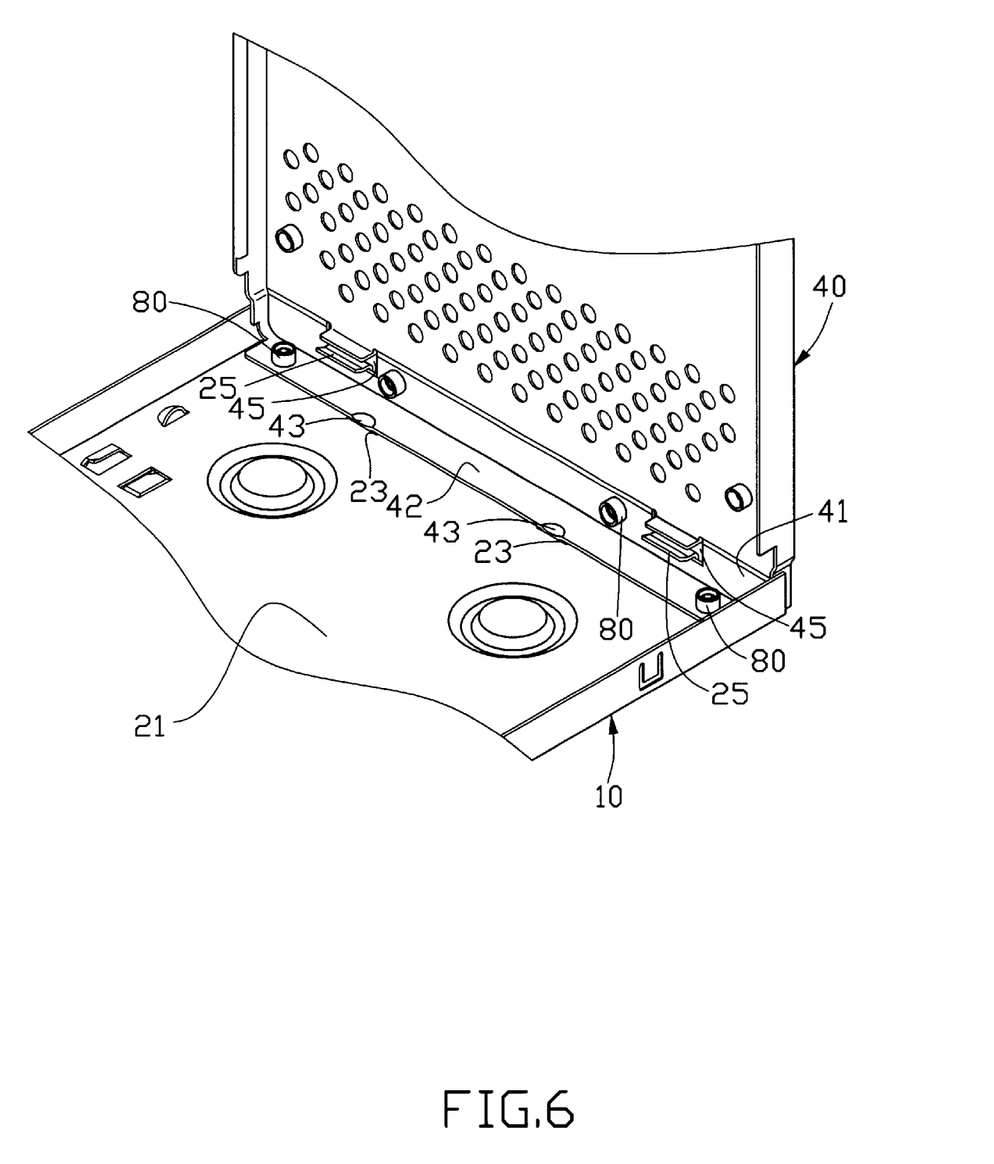
FIG. 6 is similar to FIG. 5 but showing the front and bottom panels secured together by fasteners.

Referring to FIGS. 5 and 6, when mounting the front panel 40 to the bottom panel 10, the lower portion 41 of the front panel 40 is positioned on the front portion 21 of the bottom panel 10 and moved toward the front flange 22 whereby the lower portion 41 of the front panel 40 abuts against A the front flange 22 of the bottom panel 10 with the retaining tabs 25 received in the slots 45 and the projections 43 received in the openings 23 of the bottom panel 10. Thus, the front panel 40 is firmly retained in an upright position with respect to the bottom panel 10. The fasteners 80 may then be inserted through the holes 24, 44 of the bottom and front panels 10, 40 for securing the panels 10, 40 together as shown in FIG. 6.

Figure 7:
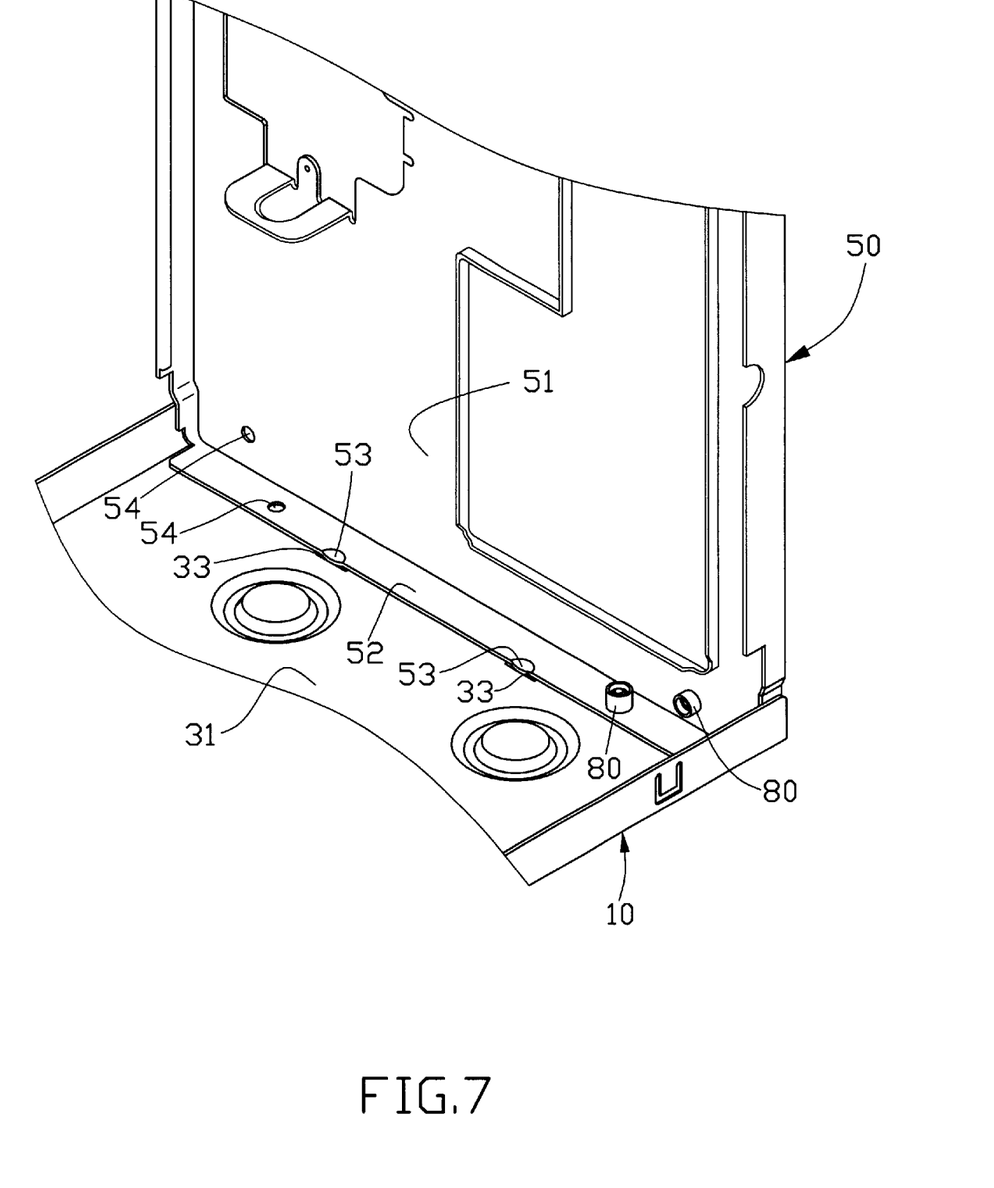
FIG. 7 is a perspective view of a portion of a rear panel and the bottom panel secured together.

Referring to FIG. 7, the rear panel 50 forms a bottom flange 52 on a lower portion 51 thereof and perpendicular thereto. The rear panel 50 is positioned on the rear portion 31 of the bottom panel 10 with the lower portion 51 thereof abutting against the rear flange 32 of the bottom panel 10. Projections 53 are formed on the bottom flange 52 of the rear panel 50 to be received in the openings 33 of the rear portion 31 of the bottom panel 10 for properly positioning the rear panel 50 with respect to the bottom panel 10. The projections 53 may be formed by pressing concave portions on the bottom flange 52 of the rear panel 50. Holes 54 are defined in the lower portion 51 and the bottom flange 52 of the rear panel 50 and are aligned with the fastener holes 34 of the rear portion 31 of the bottom panel 10 for extension of the fasteners 80 therethrough thereby securing the rear panel 50 to the bottom panel 10.

Referring to FIGS. 1 and 8, the assembled base frame 90 has a high product precision which allows the disk drive rack 60 and the main board support plate 70 to be readily mounted thereto and ensures proper mechanical stability after assembly. Furthermore, the fasteners 80 may be readily applied to the chassis 100 thereby facilitating efficient assembly of the computer chassis 100.

Although the present invention has been described with reference to the preferred embodiment, it is apparent to those skilled in the art that a variety of modifications and changes may be made without departing from the scope of the present invention which is intended to be defined by the appended claims.

What is claimed is:

1. A computer chassis comprising
   a bottom panel having an end portion defining a perpendicular first flange, a fastener hole and an opening; and
   a side panel defining a hole aligned with the fastener hole of the bottom panel, the side panel having a lower portion abutting against the flange of the bottom panel, a projection being formed on the lower portion for being received in the opening of the bottom panel thereby properly positioning the side panel with respect to the bottom panel.

2. The computer chassis as claimed in claim 1, wherein the opening is proximate the first flange.

3. The computer chassis as claimed in claim 1, wherein a second flange is formed on and perpendicular to the lower portion of the side panel.

4. The computer chassis as claimed in claim 1, wherein at least one retaining tab is formed on the first flange of the bottom panel for being received in a slot defined in the lower portion of the side panel.

5. The computer chassis as claimed in claim 4, wherein the projection is formed on the second flange for being received in the opening of the bottom panel.

6. A computer chassis comprising:
   a bottom panel having front and rear portions, a perpendicular flange and at least one opening being defined in each of the front and rear portions and at least one retaining tab being formed on the front portion;
   a front panel having a lower portion for abutting against the flange of the bottom panel, the lower portion forming a projection corresponding to the opening of the front portion of the bottom panel and defining a slot corresponding to the retaining tab of the bottom panel; and
   a rear panel having a lower portion for abutting against the flange of the bottom panel, the lower portion forming a projection corresponding to the opening of the rear portion of the bottom panel;
   whereby by inserting the projection and the retaining tab of the front panel in the opening and slot of the front portion of the bottom panel, the front panel is retained on the bottom panel, and whereby by inserting the projection of the rear panel in the opening of the rear portion of the bottom panel, the rear panel is properly positioned on the bottom panel.

7. The computer chassis as claimed in claim 6, wherein the openings of the front and rear portions of the bottom panel are proximate the front and rear flanges of the bottom panel.

8. The computer chassis as claimed in claim 6, wherein a bottom flange is formed on the lower portion of each of the front and rear panels and perpendicular thereto.

9. The computer chassis as claimed in claim 6, wherein the retaining tab of the front portion of the bottom panel is formed on the front flange thereof.

10. The computer chassis as claimed in claim 6, wherein the retaining tab extends inwardly and is substantially parallel to the bottom panel.

11. The computer chassis as claimed in claim 6, wherein the retaining tab extends inwardly from the front flange of the bottom panel and is substantially parallel to the bottom panel.

12. The computer chassis as claimed in claim 6, wherein holes are defined in the bottom panels and each of the front and rear panels and are aligned with each other for receiving fasteners therein to secure the front and rear panels to the bottom panels.

13. The computer chassis as claimed in claim 6 further comprising a disk drive rack and a main board support plate mounted to the front, rear and bottom panels.

14. The computer chassis as claimed in claim 8, wherein the projections of the front and rear panels are formed on the bottom flange thereof.

15. The computer chassis as claimed in claim 8, wherein the slot of the front panel is proximate the bottom flange of the front panel.

* * * * *